June 30, 1970  P. W. KOK  3,518,435
AUTOMATIC X-RADIATION COLLIMATING APPARATUS RESPONSIVE
TO FILM CASSETTE SIZE
Filed Nov. 24, 1967

INVENTOR.
PIETER W. KOK

BY
AGENT

United States Patent Office 3,518,435
Patented June 30, 1970

3,518,435
AUTOMATIC X-RADIATION COLLIMATING APPARATUS RESPONSIVE TO FILM CASSETTE SIZE
Pieter W. Kok, New Milford, N.J., assignor, by mesne assignments, to U.S. Philips Corporation, New York, N.Y., a corporation of Delaware
Filed Nov. 24, 1967, Ser. No. 685,448
Int. Cl. G21f 5/04; H01j 35/16
U.S. Cl. 250—105                                   4 Claims

ABSTRACT OF THE DISCLOSURE

An apparatus for automatically collimating the X-radiation cone emanating from an X-ray tube head of a radiographic examining apparatus. A film cassette sensor which indicates the size of the particular film cassette being utilized activates a mechanism which increases or decreases a diaphragm opening through which the X-radiation passes to correspond with the size of film cassette indicated. The size of the diaphragm opening determines the X-radiation cone size.

---

Figure 1:
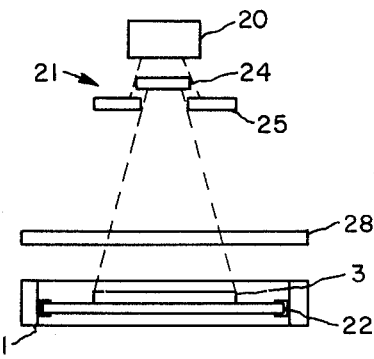

This invention relates to an apparatus for automatically regulating the diaphragm opening in the X-ray tube head from which the X-radiation emerges. Particularly, the invention relates to an apparatus which correlates the diaphragm opening and hence the radiation cone area to the size of the particular film which is being utilized in the radiographic device.

Current radiographic devices of the type having a Bucky housing containing a reciprocating Potter-Bucky diaphragm and a removable film cassette, and an X-ray tube head assembly with a diaphragm assembly for controlling the size of the cone of X-radiation emanating from the tube head provide for the manual adjustment of the longitudinal and lateral shutters which define the diaphragm assembly. The Bucky housings are adapted to receive film cassettes of varying size, and therefore regulation of the radiation cone size is necessary in order to achieve correspondence with the varying film sizes as well as to limit the area of film exposure when less than the whole film area is to be exposed. In order to insure that the film in a particular cassette is entirely exposed, standard operating procedures require radiation cone areas larger than the film area. These recommended oversized exposure areas are to compensate for any errors which might occur. Due to the varying skills of the personnel who normally operate the equipment errors, such as improper placement of the film cassette in the holder, imprecise setting of the dials which define the diaphragm size and improper positioning of the patient are errors which are expected and the procedures attempt to compensate for them. However, this excessive radiation exposes the patient to greater radiation dosage than is necessary for the examination and also subjects the patient to a potential health hazard, especially if repeated examination is required.

It is an object of the invention to automatically collimate the X-radiation emanating from the X-ray tube head.

It is an object of this invention to provide an apparatus which limits the X-radiation zone to an area the size of the film within the film cassette.

It is a further object of the invention to provide an X-ray apparatus wherein the X-radiation zone can be reduced to an area less than the film area but cannot be increased to an area greater than the film area.

An object of this invention is to insure that the X-radiation cone area is limited to the film area immediately after the film cassette has been inserted into the radiographic apparatus.

An additional object of the invention is to provide an apparatus for limiting the X-radiation cone area which does not interfere with the insertion and removal of the film cassette from the radiographic apparatus.

In accordance with the invention apparatus is provided which first determines the size of the film which is to be exposed and secondly, activates a drive mechanism which controls the opening of the diaphragm through which the X-radiation is transmitted as it emerges from the X-ray tube head. A cassette sensor assembly is located in a Bucky housing. The sensor assembly includes a first arm for determining the length of the film cassette and a second arm for determining the width of the film cassette. Each of the arms is coupled with a multi-contact switch. Each switch contact represents a different length or width dimension. An electrical circuit interconnects the multi-contact switch and a motor, the latter of which regulates a shutter apparatus to define the diaphragm opening. Movement of the arms of the cassette sensor to various positions as predicated by a particular cassette configuration closes the circuit thus activating the motor and regulating the size of the diaphragm opening. An extension on either of the arms may be included which is adapted to engage a portion of the Bucky housing thereby pivoting the arm out of the region where the cassette is located thus obviating interference with the cassette during insertion or removal.

Figure 2:
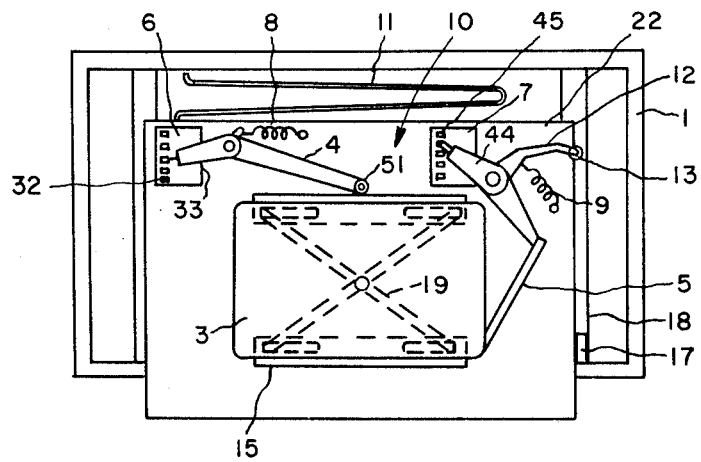
Figure 3:
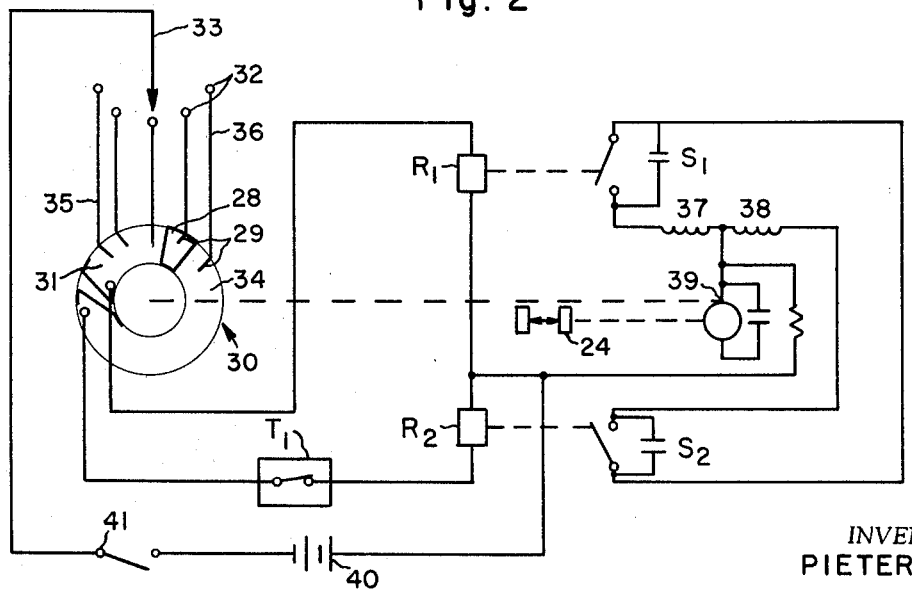

The invention will be described in greater detail with reference to a preferred embodiment thereof illustrated in the accompanying drawings, in which:

FIG. 1 shows diagrammatically an X-ray tube with a diaphragm, overlying the table top of a Bucky type radiographic apparatus, FIG. 2 shows a cassette sensor assembly according to the invention attached to the carriage of a Bucky housing, and FIG. 3 is a schematic diagram showing one of the switches of the cassette sensor assembly in conjunction with the control circuit for operating one shutter mechanism of the diaphragm assembly.

FIG. 1 shows an X-ray tube head 20 having a diaphragm assembly 21 attached thereto which overlies a table top 28 and a Bucky housing 1. The diaphragm assembly 21 includes two pairs of movable shutters 24 and 25. Shutters 25 open and close in a direction parallel to the plane of the drawing and shutters 24 open and close in a direction normal thereto. A conventional gear mechanism coupled to a small electric motor 39 provides the opening and closing motion.

A carriage 22 is slidably inserted into the Bucky housing 1. A film cassette 3 is mounted on the carriage 22 by means of a scissors type clamping frame 19. The scissors mechanism consists of a pair of centrally pivoted bars which are slidably mounted in grooves in the clamping plates 15. The central pivot provides the connection between the clamping frame 19 and the carriage 22. Movement of the clamping plates 15 is restricted to a translatory path by rails (not shown). Movement of one clamping plate 15 towards or away from the central pivot will move the opposing clamping plate in a similar manner. A spring mechanism (not shown) provides the clamping force for holding the cassettes 3. The clamping frame 19 will receive film cassettes of varying size, particularly the standard sized cassettes having a length or width of eight, ten, twelve, fourteen, or seventeen inches.

The carriage 22 which slides in channels 18 along the side walls of the Bucky housing is withdrawn from the housing when a film cassette 3 is to be either inserted or removed. Attached to the carriage 22 is a cassette sensor assembly 10. The cassette sensor assembly includes a first pivotal arm 4 mounted on the carriage and includes a roller 51 on the end thereof remote from the pivot. The roller 51 biasingly contacts the clamping plate 15 adjacent the rear sidewall of the housing 1. The spring 8 provides the biasing force. A first contact plate 6 having a plurality of contacts 32 thereon, is positioned adjacent the first arm. Each contact corresponds to one of the standard film cassette dimensions, i.e. eight, ten, twelve, fourteen, or seventeen inches. A movable contact arm 33 is rigidly attached to the first pivotal arm 4. Movement of clamping plates 15 will permit the pivoting of the arm 4 under the influence of the spring 8 and thereby locate movable contact arm 33 over one of the contacts 32. The particular contact location is determined by the film cassette size. An electrical cable assembly 11 couples the first pivotal arm with the mechanism for operating the diaphragm assembly 21.

A second pivotal arm 5 senses the lateral dimension of the film cassette 3 in the same manner as the first arm senses the longitudinal dimension of the cassette 3. Again, a spring 9 biases the second pivotal arm 5 into contact with the film cassette 3. A second contact arm 44 attached to the second pivotal arm 5 thus slidably engages the electrical contacts 45 on the second contact plate 7. The lateral dimension of the film cassette 3 will determine which electrical contact 45 the contact arm 31 will touch.

Also attached to the second pivotal arm 5 is an extension 12 having a cam follower in the form of a roller 13 thereon. The purpose of this extension and cam follower is to engage a cam surface 17 on the Bucky housing 1 when the carriage 22 is withdrawn from the housing. The cam surface strikes the cam follower 13, pivots the second pivotal arm 5 away from the film cassette and retains the arm in this position to permit removal or insertion of a film cassette without interference by the second pivotal arm. In the illustrated embodiment the first pivotal arm engages the clamping plate 15 and therefore does not interfere with the insertion or removal of a film cassette 3.

FIG. 3 is a schematic diagram of the circuit which operates the shutters 24 only. The illustrated circuit is identical to the circuit which operate the shutters 25 of the diaphragm assembly 21. When the first arm 4 is moved to a position indicating the longitudinal dimension of the cassette 3 concurrently with the insertion of the cassette 3, the contact arm 33 is in electrical contact with one of the contacts 32. Each of the contacts 32 is wired to a brush contact 29 which engages a ring switch 30. The ring switch comprises a first conductive segment 31, a second conductive segment 34 and a spacer 28 of insulating material. An air gap exists between the adjacent faces of the conductive segments 31 and 34. Segment 31 is connected to a relay $R_1$ and the second segment 34 is connected to a timer and then to a relay $R_2$. The function and operation of the timer will be described hereinafter.

The relay $R_1$ is mechanically coupled to a switch $S_1$. Switch $S_1$ is connected to a first stator winding 37 of a small D.C. servo motor 39. Relay $R_2$ is mechanically coupled to a switch $S_2$ which in turn is connected to a second stator winding 38 of the servo motor 39. Current passing through the first stator winding 37 runs the motor in one direction while current passing through the second stator winding 38 reverses the polarity of the servo motor 39 thus causing reverse rotation of the servo motor 39.

The servo motor 39 operates a conventional gear drive which serves to open and close the shutter mechanism 24. The shutter mechanism does not constitute part of the invention and therefore will not be described further. A 24 volt power supply 40 provides the power to operate the servo motor 39.

Operation of the mechanism is as follows:

After the film cassette is inserted between the clamping plates 15 on the carriage 22, the carriage is then moved into the Bucky housing 1 which closes the switch 41 thereby activating the circuit which operates the shutter mechanism 24. The first pivotal arm is already in contact with the clamping plate at a position defined by the longitudinal dimension of the film cassette 3. The contact arm 33 is in electrical contact with one of the contacts 32, for example, the contact labelled 35 in FIG. 3. The relay 1 closes switch S1 thereby starting the servo motor 39. The servo motor is mechanically coupled to the ring 30 and rotates the ring 30 in counterclockwise direction as shown in the figure, until the non-conductive element is moved into contact with contact 35 which opens the circuit and terminates motor operation. This position coincides with the shutters 24 being in the most closed position i.e. corresponding to the opening required for a cassette having a longitudinal dimension of eight inches.

Assume that the eight inch cassette is removed and a cassette having a seventeen inch longitudinal dimension is inserted. Under these circumstances, the contact arm 33 will be in electrical contact with the contact 36. Now, the circuit will be completed via conductive element 34, the timer $T_1$ and relay $R_2$. The relay $R_2$ will close switch $S_2$ thereby activating the servo motor in the opposite direction. Since switch $S_2$ is coupled to the second stator winding 38 of the servo motor 39, the polarity of the motor will be reversed and the direction of rotation will be reversed. The servo motor rotates the ring 30 in a clockwise direction until the non-conductive element 33 is moved into abutting contact with contact 36. Again the circuit is opened and operation of the servo motor is terminated. During the operation of the servo motor 39 the shutters were opened to a position corresponding to a seventeen inch cassette. The operation of shutters 25 is effected in exactly the same manner concurrently with the operation of the shutters 24.

The timer $T_1$ which is interposed between the switch ring segment 34 and the relay $R_2$ is set to open the circuit connected to the second stator winding 38 of the servo motor 39 after three seconds. The open circuit is the one which drives the servo motor in the counterclockwise direction and serves to open the shutters 24. A manual adjustment is included on the diaphragm assembly 21 (not shown) which permits the closing of the shutters 24 to a lesser extent than the automatic setting. With the circuit which drives the motor to open the shutter 24 being open, the servo motor cannot automatically reopen the shutters 24. However, if an attempt is made to open the shutters 24 to an extent greater than the automatic setting, the circuit will be activated through ring switch segment 31 and relay $R_1$ which will immediately return the shutters to the automatic setting.

What is claimed is:

1. A device for a radiographic apparatus having an X-ray tube, diaphragm and Bucky, which device will automatically adjust the diaphragm opening in response to the film cassette size comprising: a carriage slidably mounted adjacent the Bucky and spaced from the X-ray tube, a cassette receiving frame member mounted on the carriage and adapted for accommodating cassettes of varying dimensions, a diaphragm having a plurality of movable shutters placed between the X-ray tube and film cassette, servo motor means for moving the shutters to adjust the diaphragm opening, an electrical supply circuit for energizing the servo motor to accomplish the desired shutter movement, circuit activating contact means including a plurality of contacts and cooperating contact arms for selectively activating said circuit, and mechanical sensing means pivotally mounted on the carriage for sensing the separate width and length dimensions of a cassette within the frame and for translating the respective dimensional sizes by corresponding movement of the contact arms into engagement with one of the plurality of contacts, whereby the servo motor is selectively activated to automatically adjust the diaphragm opening.

2. A device as claimed in claim 1 wherein the mechanical sensing means further comprises: pivotal arm means mounted to the carriage and yieldingly urged toward the film cassettee, a contact arm affixed to the pivotal arm means for movement therewith, said contact arm being in cooperating relationship with the plurality of contacts and during movement thereof, will activate the circuit and energize the servo motor.

3. A device as claimed in claim 2 further including cam means attached to at least one of the pivotal arms for pivoting said arm away from the cassette to permit insertion and removal of the cassette.

4. A device as claimed in claim 3 further comprising a ring switch having two conductive segments in communication with the said contacts, said switch being electrically coupled to the servo motor, a spacer of non-conductive material affixed to the ring switch, means for mechanically coupling the servo motor to the ring switch such that when the contact arm engages one of the said contacts to activate the circuit and energize the motor, the ring switch will be rotated until the non-conductive segment interrupts electrical communication with the contact which will result in a de-energization of the motor.

References Cited

UNITED STATES PATENTS 2,921,202   1/1960   Berger et al. _____ 250—105

WILLIAM F. LINDQUIST, Primary Examiner

PO-1050
(5/69)

UNITED STATES PATENT OFFICE
CERTIFICATE OF CORRECTION

Patent No. 3,518,435     Dated  June 30, 1970

Inventor(s)  Pieter W. Kok

It is certified that error appears in the above-identified patent and that said Letters Patent are hereby corrected as shown below:

Col. 3, line 22, "31" should be --44--.

Signed and sealed this 25th day of July 1972.

(SEAL)
Attest:

EDWARD M. FLETCHER, JR.
Attesting Officer

ROBERT GOTTSCHALK
Commissioner of Patents